US009471352B1

(12) United States Patent
Mauer et al.

(10) Patent No.: US 9,471,352 B1
(45) Date of Patent: Oct. 18, 2016

(54) CAPABILITY BASED PLACEMENT

(71) Applicant: Amazon Technologies, Inc., Reno, NV (US)

(72) Inventors: Gustav Karl Mauer, Bellville (ZA); André Mostert, Cape Town (ZA); Christopher Richard Jacques de Kadt, Cape Town (ZA); Christopher Anthony Romanzin, Seattle, WA (US); James Alfred Gordon Greenfield, Cape Town (ZA)

(73) Assignee: Amazon Technologies, Inc., Reno, NV (US)

( * ) Notice: Subject to any disclaimer, the term of this patent is extended or adjusted under 35 U.S.C. 154(b) by 133 days.

(21) Appl. No.: 14/089,644

(22) Filed: Nov. 25, 2013

(51) Int. Cl.
*G06F 9/46* (2006.01)
*G06F 9/455* (2006.01)

(52) U.S. Cl.
CPC ................... *G06F 9/45533* (2013.01)

(58) Field of Classification Search
CPC .................................................. G06F 9/45533
USPC ............................................................. 718/1
See application file for complete search history.

(56) References Cited

U.S. PATENT DOCUMENTS

| 2010/0050172 A1* | 2/2010 | Ferris ................................ 718/1 |
| 2010/0138528 A1* | 6/2010 | Frank ............................ 709/224 |
| 2013/0097601 A1* | 4/2013 | Podvratnik ........... G06F 9/5027 718/1 |

OTHER PUBLICATIONS

Amazon Web Services, "Amazon EC2 Instances," ws.amazon.com/ec2/instance-types/> 6 pages (accessed Oct. 24, 2013).

* cited by examiner

*Primary Examiner* — Camquy Truong
(74) *Attorney, Agent, or Firm* — Klarquist Sparkman, LLP

(57) ABSTRACT

Capability based placement can be used for placing virtual machine instances on server computers (which can be configured to support one or more virtual machine slots) that are capable of running the instances in an efficient manner. For example, capability tags can be determined from the detailed characteristics (e.g., detailed hardware, software, and/or other characteristics) of the server computer and/or slots. For example, capability tags can indicate capabilities such as disk throughput, network bandwidth, database support, encryption support, video editing support, etc. Requests to launch virtual machine instances can be received and capability tags can be determined from the requests. Servers and/or slots that match the determined capability tags can be identified and used for launching the instances.

19 Claims, 8 Drawing Sheets

CAPABILITY BASED PLACEMENT

BACKGROUND

In a computing environment with many computing devices, such as a virtual server or cloud computing environment with many computer servers, determining which computing resources to assign to fulfill a customer request can be a difficult task. For example, a customer may submit a request to run an instance of a particular image or a particular software application, which may need specific computing resources to run, or to run efficiently.

Some cloud computing or virtual server environments provide a limited number of pre-defined categories of computing resources for customer selection. However, such a limited selection may not be sufficient to select computing resources that match the resources needed.

DETAILED DESCRIPTION

Overview

Figure 1:
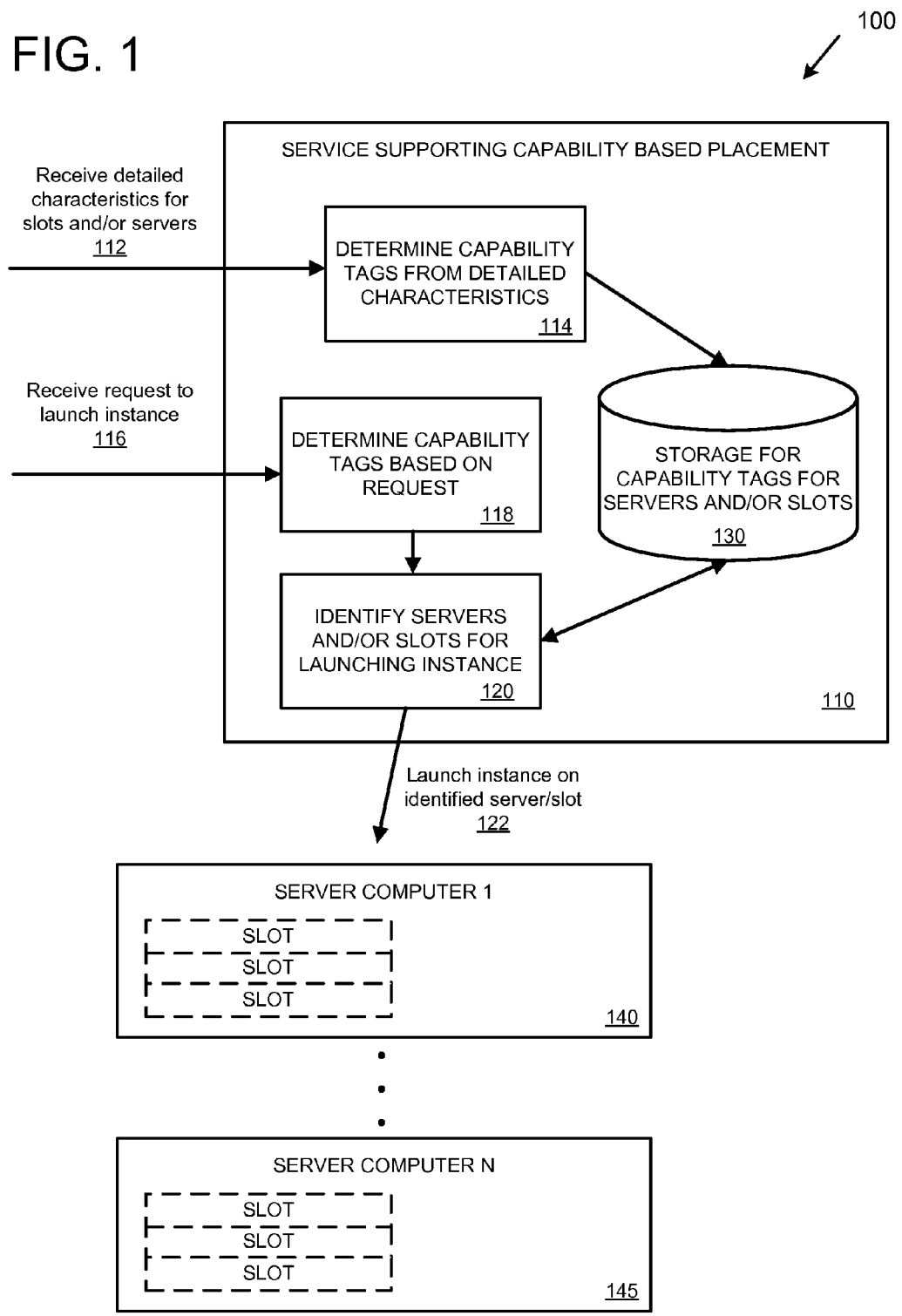
FIG. 1 is a diagram of an example environment supporting capability based placement of virtual machine instances.

The following description is directed to techniques and solutions supporting capability based placement of virtual machine instances. Capability based placement refers to placing virtual machine instances on server computers (which can be configured to support one or more virtual machine slots) that are capable of running the instances in an efficient manner. For example, capability tags can be determined from the detailed characteristics (e.g., detailed hardware, software, and/or other characteristics) of the server computers and/or slots (a server computer can be configured to support one or more virtual machine slots, which may also be called partitions, each capable of running an instance of a virtual machine image). The capability tags can refer to higher-level capabilities of the server computers and/or slot (e.g., higher-level characteristics as compared to the detailed characteristics). For example, capability tags can indicate capabilities such as disk throughput, network bandwidth, database support, encryption support, video editing support, etc. For example, a higher-level capability such as disk throughput can be determined from one or more lower-level details of the server computer and/or slot (e.g., number of hard disk drives, rotational speed, latency, array details, etc.).

Capability based placement can be performed when requests are received (e.g., from a customer) to launch virtual machine instances. For example, a number of capability tags can be determined based on the request (e.g., based on customer-selected features and/or capability tags, based on automatically determined capability tags from request details such as the selected image, and/or based on other criteria). A list of available computer servers and/or virtual machine slots can then be examined to identify which computer servers and/or slots satisfy the needed capabilities (e.g., that match the capability tags determined for the request). One of the identified computer servers and/or slots can then be selected for launching the requested image.

The techniques and solutions described herein supporting capability based placement of virtual machine instances can provide flexibility, improved performance, and more efficient utilization of computing resources when compared to other solutions. For example, maintaining a complete list of computer servers and/or slots and all of their associated hardware and software details can be difficult to create, store, update, and search. Instead, the techniques and solutions described herein can be applied to determine higher-level capabilities for the server computers and/or slots which can be efficiently created, stored, and matched so that appropriate computing resources can be selected for running virtual machine instances.

Detailed Characteristics

In the embodiments described herein, detailed characteristics describe details of computing resources that support virtual machine instances running on server computers. Detailed characteristics can include detailed hardware characteristics. Detailed hardware characteristics can include details of the hardware components of a server computer that is configured to support virtual machines. For example, hardware characteristics can include detailed information describing processing units of a computer server (e.g., central processing unit (CPU) speed, CPU manufacturer, CPU family, supported instruction sets, number of cores, number of CPUs, other types of processing units such as graphics processing units (GPUs), and/or other information describing processing units), memory (e.g., amount and/or type of RAM), network information (e.g., type and/or speed of network adaptors), storage information (e.g., number, type, and/or size of hard disks and/or solid-state drives (SSDs)), and/or other hardware details.

Detailed characteristics can also include detailed software characteristics. Detailed software characteristics can include details of the software components of a server computer. For example, software characteristics can include detailed information describing virtualization software running on the server computer (e.g., type and/or version information, which can include virtualization software types such as Xen, VMware, Hyper-V, etc.), operating system information (e.g., operating system kernel, operating system type and/or version, etc.), Basic Input/Output System (BIOS) information (e.g., type and/or version information), device driver information, and/or information describing other software components (e.g., network virtualization software).

Detailed characteristics can also include other details related to, or associated with, server computers that support virtual machine instances. Other types of detailed characteristics can include, for example, detailed location information (e.g., the location of a server computer within a data center, such as a specific room, rack, location within a rack, etc.), region information (e.g., geographical location within a country), environmental information (e.g., power supply type and reliability), security information, physical or virtual proximity information (e.g., whether the server computer is close, in physical and/or network connectivity terms, to a storage repository or high-speed network backbone), proximity to natural resources such as natural cooling, proximity to particular types of events such as hurricanes, and/or legal or legislative environments which can comprise the country where the server computers are located (e.g., subject to European Union data protection laws, U.S. government certification requirements, etc.).

Detailed characteristics can be related to, or associated with, a specific server computer and/or virtual machine slots of the specific server computer. For example, a server computer can be configured to support one or more virtual machine slots, with each virtual machine slot associated with a set of resources of the server computer that can be used to run an instance of a virtual machine image. Detailed characteristics can be determined for a server computer as a whole (e.g., if the server computer is configured to support a single slot, then the detailed characteristics can be essentially the same for the server computer and the slot) or the detailed characteristics can be independently associated with the server computer and/or the slots. For example, a server computer may have four hard disk drives. If the server computer is configured with four virtual machine slots, then each slot can be associated with one of the four hard disk drives (e.g., each slot can be assigned a detailed hardware characteristic indicating one hard disk drive of a particular type and/or size). As another example, a server computer may have a gigabit network interface and all four slots can be associated with a detailed hardware characteristic indicating the gigabit network interface.

Capability Tags

In the embodiments described herein, capability tags describe capabilities of server computers for supporting virtual machine instances. Capability tags can be determined from detailed characteristics, such as detailed hardware characteristics, detailed software characteristics, and/or other types of detailed characteristics.

In some implementations, capability tags describe higher-level capabilities of a server computer and/or slot (e.g., higher-level capabilities as compared to the detailed characteristics of the server computer and/or slot). For example, detailed hardware characteristics of a server computer or slot may indicate a specific number of hard disk drives. Based on the specific number of hard disk drives, a capability tag can be determined indicating disk storage throughput as being high, medium, or low (e.g., a higher-level capability that is based on the lower-level detailed hard disk information).

Capability tags can indicate capabilities of server computers and/or slots in a variety of ways. For example, a capability tag can indicate the presence or absence of a capability. Indicating the presence or absence of a capability can be accomplished by assigning a capability tag to a server computer and/or slot that has that capability. For example, if a particular server computer has a high-bandwidth network connection, then the particular server computer can be associated with a capability tag indicating the high-bandwidth network connection (e.g., a capability tag such as "HighNetworkBandwidth"), while another particular server computer that does not have a high-bandwidth network connection would not have the high-bandwidth network connection capability tag (e.g., would not be associated with the "HighNetworkBandwidth" tag).

Indicating the presence or absence of a capability can also be accomplished by assigning a value, such as true or false, to the capability tag. For example, a server computer and/or slot that has high disk storage throughput can be associated with the capability tag "HighDiskThroughput=true," while a server computer and/or slot that has lower disk throughput (e.g., lower than a threshold value, which may include evaluation of multiple detailed characteristics) can be associated with the capability tag "HighDiskThroughput=false."

Instead of, or in addition to, indicating presence or absence of a capability, a capability tag can indicate a level, quantity, quality, or another attribute of the capability. For example, a capability tag indicating network bandwidth can indicate whether the network bandwidth is high speed, medium speed, or low speed (e.g., using a name-value pair). For example, the capability tag can be assigned a value, such as "NetworkBandwidth=high," "NetworkBandwidth=medium," or "NetworkBandwidth=low."

One example of a capability tag is a capability tag indicating network capacity. For example a network capacity capability tag can indicate whether a server computer and/or slot has high network bandwidth, low network latency, etc. The network capacity capability tag can be based on various detailed characteristics, such as network speed (e.g., 100 Mbit, Gigabit, 10 Gigabit), network adaptor type (e.g., optical or copper), network latency (e.g., latency to a particular switch or backbone), and/or other detailed characteristics.

Another example of a capability tag is a capability tag indicating disk storage throughput. For example, a disk storage throughput capability tag can indicate whether a server computer and/or slot has high disk storage throughput (e.g., "HighDiskThroughput"=true or false) or a level of disk storage throughput (e.g., "DiskThroughput"=high, medium, or low). The disk storage throughput capability tag can be based on various detailed characteristics, such as a number of hard disk drives, the size of the hard disk drives, the speed of the hard disk drives (e.g., RPM), configuration information for the hard disk drives (e.g., RAID array information), and/or other detailed characteristics.

Another example of a capability tag is a capability tag indicating encryption support. For example, an encryption support capability tag can indicate whether a server computer and/or slot is suited for a particular type of encryption. For example, if a server computer and/or slot is running on a CPU supporting the Intel® Advanced Encryption Standard (AES) Instructions Set, such as the Intel Xeon® E5620, then the server computer and/or slot can be associated with a capability tag indicating encryption support (e.g., "EncryptionSupport" or "EncryptionSupport=true").

Another example of a capability tag is a capability tag indicating operating system support. For example, an operating system capability tag can indicate whether a server computer and/or slot is suited for a particular operating system. For example, if a server computer and/or slot uses CPUs from a particular manufacturer and has a particular type or version of BIOS, then the server computer and/or slot can be associated with a capability tag indicating operating system support (e.g., "OperatingSystemSupport=Windows" or "OperatingSystemSupport=Linux").

Another example of a capability tag is a capability tag indicating whether a server computer and/or slot has access to local disk storage that is not persistent (e.g., that does not persist when an instance is shut down). Such a capability tag can be called an ephemeral store capability tag. For example, if a server computer and/or slot can store data on at least one local hard disk, then the server computer and/or slot can be associated with an ephemeral store capability tag (e.g., "ephemeral-store" or "ephemeral-store=true").

Determining Capability Tags

In the embodiments described herein, capability tags can be determined from detailed characteristics. For example, detailed characteristics can be obtained for one or more server computers and/or virtual machine slots. From the detailed characteristics, capability tags can be determined and associated with the server computers and/or virtual machine slots to describe the capabilities of the server computers and/or virtual machine slots (e.g., capabilities supporting virtual machine images).

Capability tags can be determined based, at least in part, on a single detailed characteristic. For example, a capability tag indicating high hard disk throughput can be determined based solely on the number of available hard disk drives. For example, if a server computer and/or slot has more than 7 hard disk drives, then the server computer and/or slot can be assigned a high hard disk throughput capability tag. The capability tag can also indicate levels of hard disk throughput (e.g., 1-3 hard disk drives can be assigned "DiskThroughput=low," 4-7 hard disk drives can be assigned "DiskThroughput=medium," and more than 8 hard disk drives can be assigned "DiskThroughput=high").

Capability tags can also be determined based, at least in part, on multiple detailed characteristics. Capability tags that are determined from multiple detailed characteristics can be called aggregate capability tags. For example, a capability tag indicating high hard disk throughput can be determined based on both the number of hard disk drives and the type of the hard disk drives (e.g., rotational speed, solid-state disk vs. traditional hard drive, etc.). For example, if there are more than 8 hard disk drives and they have at least 10K RPM rotational speed, then a high disk throughput capability tag can be assigned.

Another example of an aggregate capability tag can be a network bandwidth capability tag that is based on at least network speed and connector type. For example, a computer server and/or slot that has a network connection with gigabit speed, optical connection, and is connected to a high-capacity backbone may be assigned a capability tag of "NetworkBandwidth=very_high," while a computer server and/or slot that has a network connection with gigabit speed, a fiber network adaptor, but is not connected directly to a high-capacity backbone may be assigned a capability tag of "NetworkBandwidth=high."

Another example of an aggregate capability tag is a capability tag indicating that a server computer and/or slot has detailed characteristics supporting database applications. For example, a server and/or slot with high disk throughput and at least a specific amount of memory can be assigned a database capability tag (e.g., regardless of other detailed characteristics, such as the type of network connection).

Another example of an aggregate capability tag is a capability tag indicating that a server computer and/or slot is configured to support video editing applications (e.g., video encoding/decoding, video processing, etc.). For example, a server and/or slot with high network bandwidth (e.g., at least a gigabit network connection), high disk throughput (e.g., at least 10 hard disk drives with low latency), and a large amount of memory (e.g., at least 32 GB RAM) can be assigned a video editing capability tag.

Capability tags can be created to represent any desired capability of a server computer and/or slot based on any number of detailed characteristics associated with the server computer. For example, rules can be created that define which capability tags to assign to the server computer and/or slot based on the detailed characteristics (e.g., based on presence or absence of one or more detailed characteristics, based on ranges of values for one or more detailed characteristics, and so forth).

Placing Instances Based on Capability Tags

In any of the embodiments described herein, virtual machine instances can be placed using capability tags. For example, a request to launch a virtual machine instance can be received (e.g., by a placement service or another type of service that receives request and determines where to launch instances based on capability tags). The received request can be analyzed to determine the capabilities needed by the instance and corresponding capability tags can be determined. For example, if a request is received to launch an instance with a corresponding virtual machine image running a database application, then a database capability tag can be determined and assigned to the request.

One or more capability tags have been determined for a requested instance, then one or more server computers and/or slots can be identified that satisfy the capability tags determined for the request. For example, a database of server computers and/or slots can be maintained along with their associated capability tags. The determined capability tags can then be matched to those in the database and a set of potential servers and/or slots can be identified that satisfy the request. In some implementations, the servers and/or slots must have all of the capability tags determined for the request. In other implementations, the servers and/or slots may not have all of the capability tags (e.g., some capability tags can be designed as required while other capability tags can be designed as optional).

Once a set of servers and/or slots have been identified that satisfy the capability tags associated with the request, then the instance can be launched on one or more of the identified servers and/or slots. For example, one or more of the qualifying servers and/or slots can be selected at random, or other selection criteria can be used (e.g., servers and/or slots can be selected based on regional workload, based on proximity to a customer's other instances, and/or based on other criteria).

Environment Supporting Capability Based Placement

In any of the embodiments described herein, an environment can be provided that supports capability based placement of virtual machine instances using capability tags. For example, the environment can be provided as part of a virtual server environment or a cloud computing environment that provides computing resources (e.g., server computers and/or virtual machine slots) running virtual machine instances (e.g., at the request of customers).

FIG. 1 is a diagram of an example computing environment 100 supporting capability based placement of virtual machine images. The example environment 100 comprises a service 110 supporting capability based placement. For example, the service 110 can comprise various types of computing resources (e.g., server computers, databases, etc.) and can be a centralized service, a distributed service, or another type of service. The service 110 can be called a placement service and/or a capacity management service. In some implementations, the service 110 can be part of, or associated with, a capacity tracker service (e.g., or managing computing resources) and/or an instance manager service (e.g., for managing instance launching).

As depicted in the example environment 100, detailed characteristics are received (as depicted at 112) by the service 110 for slots and/or computer servers. For example, the detailed characteristics can be received directly from computer servers (e.g., directly from a service, such as a management service, running on the computer servers). The detailed characteristics can also be received from another source (e.g., from an inventory service, from an administrator, etc.). The detailed characteristics can include detailed hardware characteristics, detailed software characteristics, and/or other types of detailed characteristics that describe any number of server computers and/or the virtual machine slots supported by the server computers. For example, detailed characteristics can be received for depicted server computers 1 through N (140 and 145).

When detailed characteristics are received (as depicted at 112) by the service 110, capability tags can be determined (as depicted at 114) from the received detailed characteristics. The determined capability tags can be stored by the service 110 (e.g., stored by server and/or slot). For example, the capability tags can be stored in a database 130.

As depicted in the example environment 100, requests are received (as depicted at 116) by the service 110 to launch instances. For example, the requests can be received from a customer (also called a tenant) or from another source (e.g., from a management service). The received requests can include request information, such as a specific type of image to launch (e.g., describing operating system details, software application details, requested features, etc.). Based on the received request, capability tags can be determined (as depicted at 118). For example, capability tags can be determined based on request information including instance details (e.g., image software), based on requested features (e.g., user-selected features), and/or based on other information.

As depicted in the example environment 100, once capability tags have been determined based on the received request (as depicted at 118), servers and/or slots are identified that match the determined capability tags (as depicted at 120). For example, the determined capability tags can be compared to capability information (e.g., servers and/or slots and their associated capability tags) stored in the database 130. Servers and/or slots that match the determined capability tags can be returned and one or more of the servers and/or slots can be selected for launching the instance (as depicted at 122).

Methods Supporting Capability Based Placement

In any of the embodiments described herein, methods can be provided for determining capability tags based on detailed characteristics and storing the determined capability tags. Methods can also be provided for receiving requests to launch instances and identifying servers and/or slots based on capability tags.

Figure 2:
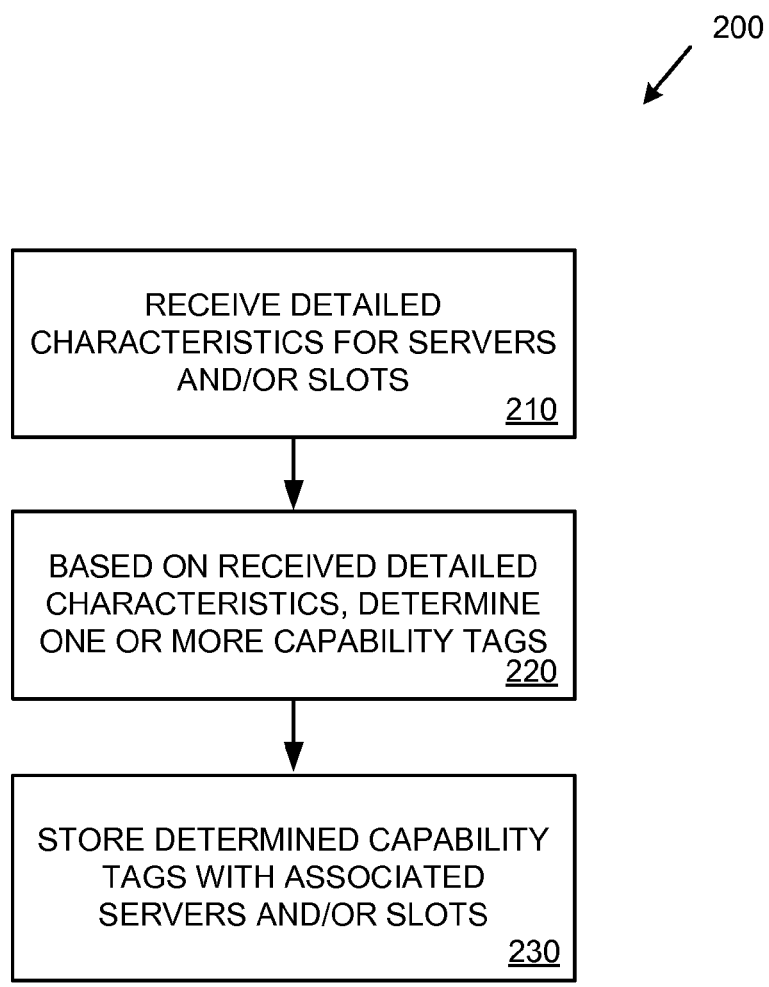
FIG. 2 is a flowchart of an example method supporting capability based placement of virtual machine instances, including determining capability tags based on detailed characteristics.

FIG. 2 is a flow chart of an example method 200 supporting capability based placement of virtual machine instances, including determining capability tags based on detailed characteristics. The method 200 can be performed, for example, by the service 110 depicted in FIG. 1 (e.g. by a placement service).

At 210, detailed characteristics are received for each of one or more computer servers and/or virtual machine slots. The detailed characteristics can comprise detailed software characteristics, detailed hardware characteristics, and/or other types of detailed characteristics (e.g., location details).

At 220, one or more capability tags are determined for the servers and/or slots based on the received detailed characteristics. For example, capability tags can be determined for each of one or more servers and/or slots. Capability tags can be determined from single detailed characteristics (e.g., just the number of hard disk drives) and/or from multiple detailed characteristics (e.g., an aggregate capability tag can be determined based on the number of hard disk drives and the network connection speed). Capability tags can describe higher-level capabilities of the computer servers and/or slots than the detailed characteristics.

At 230, the determined capability tags are stored with their associated servers and/or slots. For example, the stored information can include a server and/or slot identifier along with its associated capability tags.

Figure 3:
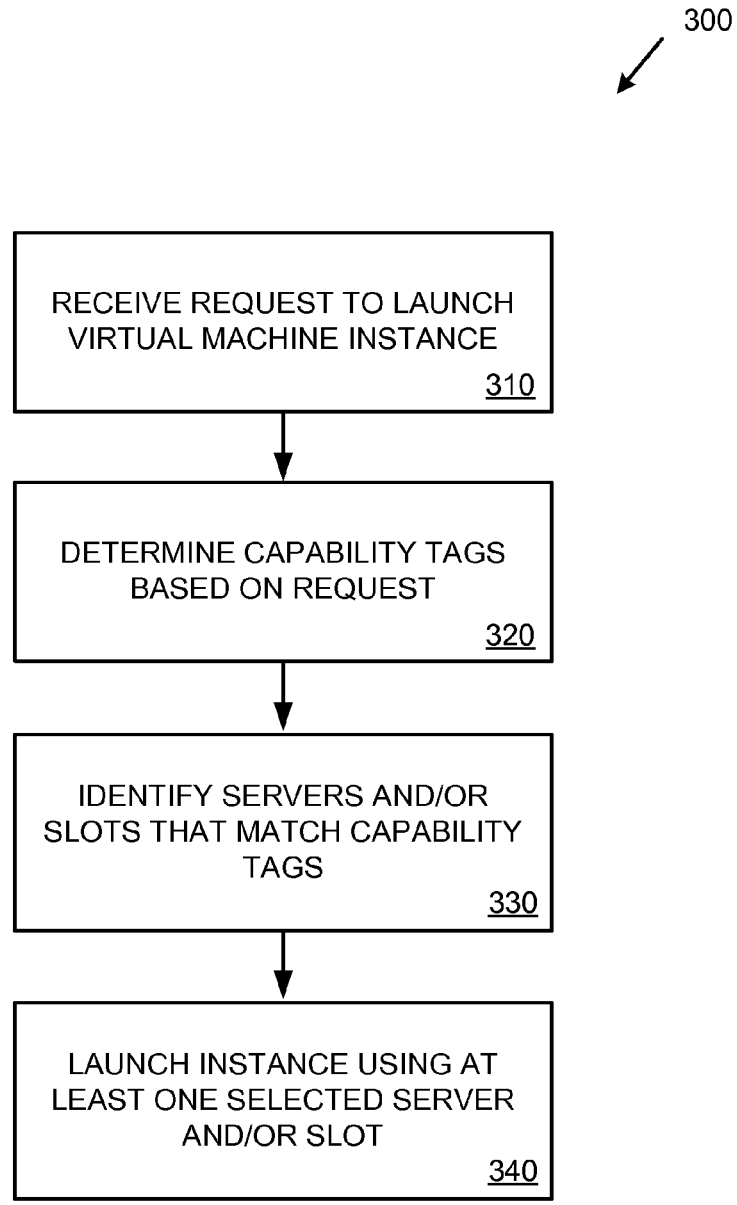
FIG. 3 is a flowchart of an example method supporting capability based placement of virtual machine instances, including identifying a server and/or slot for launching an instance.

FIG. 3 is a flow chart of an example method 300 supporting capability based placement of virtual machine instances, including identifying a server and/or slot for launching a virtual machine instance. The method 300 can be performed, for example, by the service 110 depicted in FIG. 1 (e.g. by a placement service).

At 310, a request is received to launch a virtual machine instance. For example, the request can be received directly (e.g., from a customer or tenant) or from another source (e.g., from a management service). The request can comprise information related to the request, such as instance information, applications that will be running on the instance, requested virtual machine image, requested features, etc.

At 320, one or more capability tags are determined based on the received request. For example, the request can comprise information indicating one or more features (e.g., features selected by the customer making the request). For example, if the customer requests that the server and/or slot be configured to support video editing applications, then capability tags can be determined to support video editing (e.g., a capability tag specifically for video editing or capability tags that would support video editing, such as high disk throughput, large memory, and fast CPU). In some implementations, at least some capability tags are exposed for customer selection (e.g., capability tags correspond to selectable features, such as a video editing capability tag and a corresponding selectable video editing feature). Other customer-selectable features can include: a feature for database support, a feature for web server support, and a general purpose feature.

Capability tags can also be automatically determined based on the request (e.g., based on the requested virtual machine image and/or based on other factors). For example, if the image is configured to run a database application, then capability tags supporting a database application can be selected (e.g., a capability tag specifically for database support, a capability tag for high disk throughput, and/or other capability tags useful for running a database application). Capability tags can also be created for specific software applications, such as a capability tag for a specific SAP® database application. Other factors for automatically determining capability tags can include the intended use of the image (e.g., general purpose, processor intensive, etc.), the software that will run on the image (e.g., web server software, encryption software, etc.), and past usage history (e.g., what application or applications that the customer used in the past for the same or similar image).

In some implementations, capability tags are determined from pre-associated capability tags associated with a requested virtual machine image. For example, a vendor, customer, or developer can select a virtual machine image (e.g., from a number of base images), install specific software (e.g., video editing software, encryption software, etc.), and associate capability tags with the image (e.g., a capability tag indicating encryption support or video editing support is needed to run the image). The pre-associated capability tags for the virtual machine image can be stored, for example, in meta-data associated with the image. When the virtual machine image is selected for the request (e.g., at 310), any pre-associated capability tags can then be identified and used as one or more of the capability tags for the request (e.g., as the determined capability tags at 320). For example, a catalog of virtual machine images can be provided by an online marketplace for customer selection. Any pre-associated capability tags for the selected virtual machine image can then be used for capability based placement.

In some implementations, some capability tags can be specified (e.g., based on customer selected features) while other capability tags can be automatically determined based on the request to launch the virtual machine instance.

In some implementations, capability tags can be divided into different categories (e.g., into a hierarchy of capability tags). For example, some capability tags can be designated as required while other capability tags can be designated as optional. Based on a received request, capability tags can then be determined for the different categories. For example, if a request is received to launch an instance running a particular database application, then a required capability tag could be determined for high disk throughput (e.g., a capability tag that specifies more than 8 hard disk drives) and an optional capability tag could be determined for processing power (e.g., a capability tag that specifies a minimum CPU type and/or speed). In some situations, a server computer and/or slot may not be available that matches all of the determined capability tags. In such a situation, the determined capability tags can be matched according to the hierarchy (e.g., required tags matched first, followed by optional tags).

At 330, servers and/or slots are identified that match the capability tags determined at 320. The servers and/or slots can be identified by matching capability tags associated with a set of available servers and/or slots (e.g., from server and/or slot information stored in a database).

At 340, the requested virtual machine instance is launched using at least one selected server and/or slot from the servers and/or slots identified at 330.

Example Implementation

Figure 4:
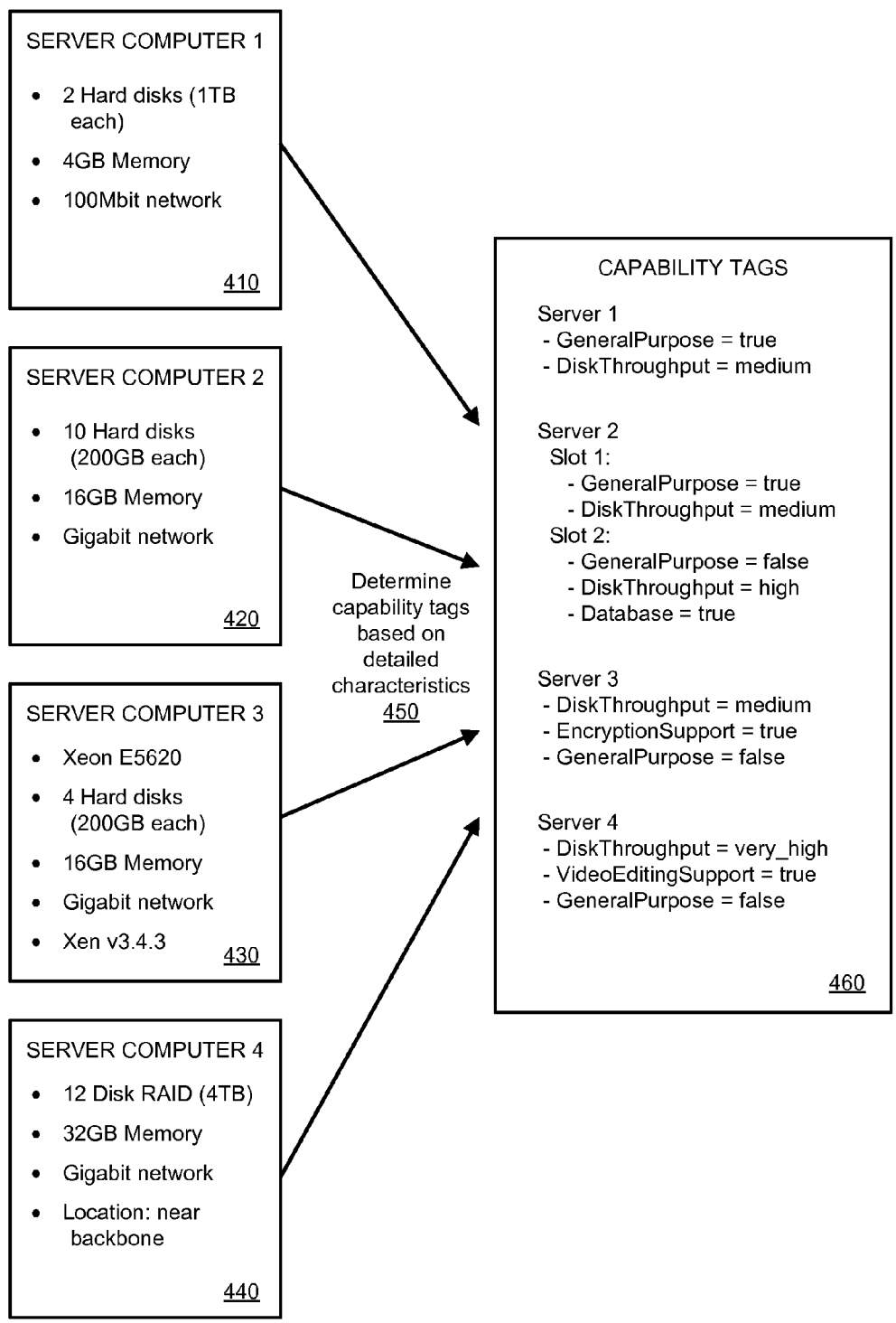
FIG. 4 is a diagram of an example implementation for determining capability tags based on detailed characteristics.

FIG. 4 is a diagram of a simplified example implementation for determining capability tags based on detailed characteristics. As depicted in FIG. 4, example detailed characteristics are displayed for four server computers (410, 420, 430, and 440). For example, server computer 1 (410) has detailed hardware characteristics comprising 2 hard disks of 1 TB each, 4 GB memory, and a 100 Mbit network connection, server computer 2 (420) has 10 hard disk drives, 16 GB memory and a gigabit network connection, server computer 3 (430) has a Xeon E5620 processor, 4 hard disk drives of 200 GB each, 16 GB memory, a gigabit network connection, and is running Xen version 3.4.3 (a detailed software characteristic), while server computer 4 has a 12 disk RAID array, 32 GB memory, a gigabit network, and is located near a high-speed network backbone (a detailed location characteristic). The detailed characteristics depicted in FIG. 4 are only examples of possible detailed characteristics, and servers and/or slots may have greater, fewer, or different detailed characteristics.

As depicted at 450, capability tags are determined from the detailed characteristics of the four server computers (410, 420, 430, and 440). The detailed characteristics (as depicted at 460) can be saved (e.g., in a database or other type of data storage) for use later during capability based placement. As depicted at 460, the detailed characteristics associated with a particular server are used to determine the capability tags for that particular server. For example, the detailed characteristics for server computer 1 (410) are used to determine the capability tags of "GeneralPurpose=true" and "DiskThroughput=medium" for Server 1 as depicted in the first entry at 460. This is an example of capability tags being associated with a server computer (e.g., a server computer that has one virtual machine slot or a server computer where all slots have the same capability tags). If a server computer supports multiple virtual machine slots, then the capability tags can be assigned to a slot, and could be different between slots (e.g., detailed characteristics may be allocated to, or divided among, the slots). For example, the detailed characteristics for server computer 2 have been divided between two virtual machine slots such that slot 1 has received fewer computing resources than slot 2 (e.g., slot 1 may be assigned 2 hard drives and 4 GB memory, while slot 2 may be assigned 8 hard disks and 12 GB memory). As a result the capability tags depicted at 460 are different between slot 1 and slot 2 of server computer 2 (420).

Example Service Provider Environments

Figure 5:
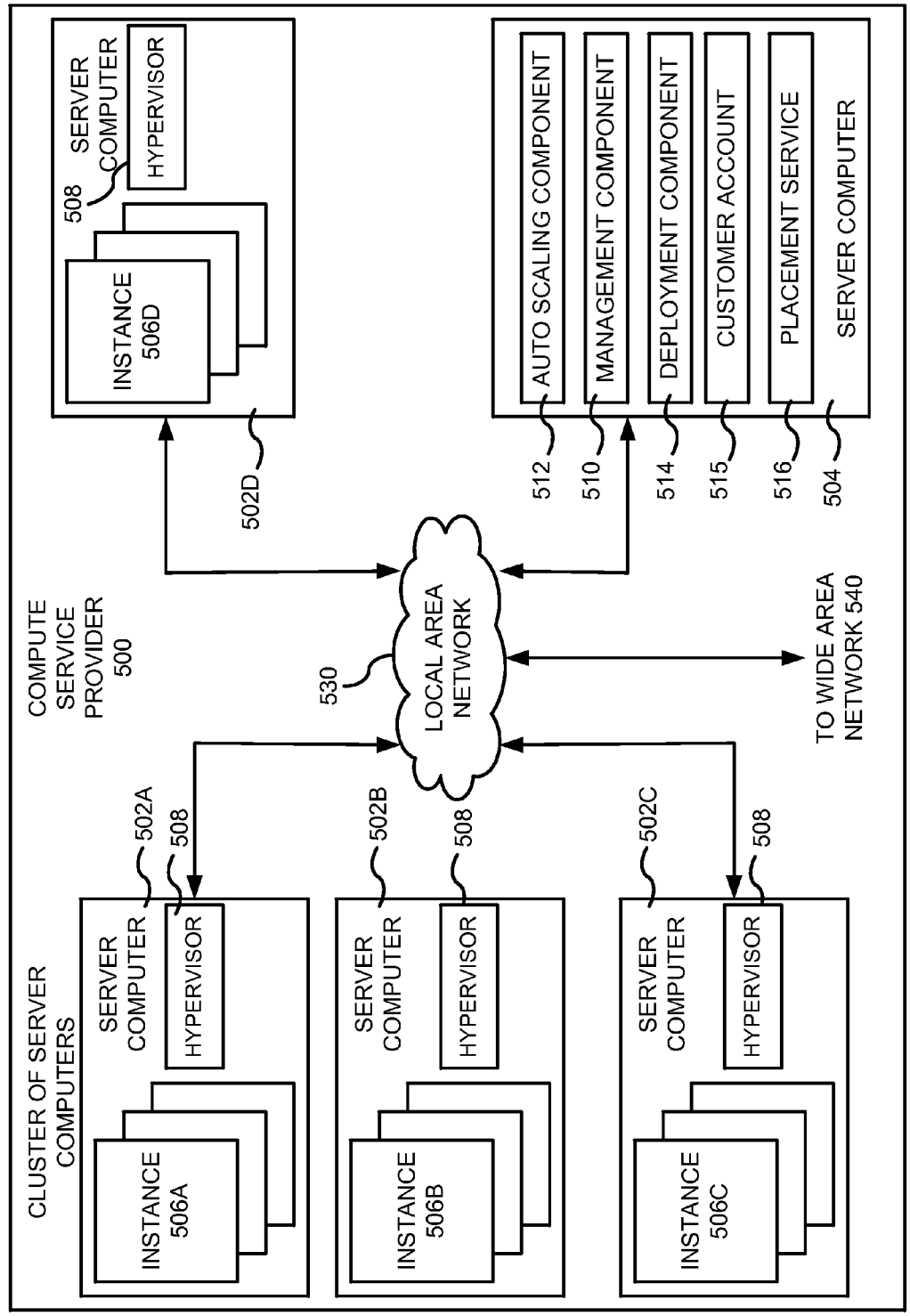
FIG. 5 is an example system diagram showing a plurality of virtual machine instances running in the multi-tenant environment.

FIG. 5 is a computing system diagram of a network-based compute service provider 500 that illustrates one environment in which embodiments described herein can be used. By way of background, the compute service provider 500 (i.e., the cloud provider) is capable of delivery of computing and storage capacity as a service to a community of end recipients. In an example embodiment, the compute service provider can be established for an organization by or on behalf of the organization. That is, the compute service provider 500 may offer a "private cloud environment." In another embodiment, the compute service provider 500 supports a multi-tenant environment, wherein a plurality of customers operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

The particular illustrated compute service provider 500 includes a plurality of server computers 502A-502D. While only four server computers are shown, any number can be used, and large centers can include thousands of server computers. The server computers 502A-502D can provide computing resources for executing software instances 506A-506D. In one embodiment, the instances 506A-506D are virtual machines. As known in the art, a virtual machine is an instance of a software implementation of a machine (i.e. a computer) that executes applications like a physical machine. In the example, each of the servers 502A-502D can be configured to execute a hypervisor 508 or another type of program configured to enable the execution of multiple instances 506 on a single server. For example, each of the servers 502A-502D can be configured (e.g., via the hypervisor 508) to support one or more virtual machine slots, with each virtual machine slot capable of running a virtual machine instance (e.g., server computer 502A could be configured to support three virtual machine slots each running a corresponding virtual machine instance). Additionally, each of the instances 506 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 504 can be reserved for executing software components for managing the operation of the server computers 502 and the instances 506. For example, the server computer 504 can execute a management component 510. A customer can access the management component 510 to configure various aspects of the operation of the instances 506 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 512 can scale the instances 506 based upon rules defined by the customer. In one embodiment, the auto scaling component 512 allows a customer to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506 of computing resources. The deployment component can have access to account information associated with the instances, such as who is the owner of the account, credit card information, country of the owner, etc. The deployment component 514 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the customer-provided configuration and cache logic to configure, prime, and launch new instances 506. The configuration, cache logic, and other information may be specified by a customer using the management component 510 or by providing this information directly to the deployment component 514. The instance manager can be considered part of the deployment component.

A placement service 516 can be provided to determine which server and/or slot to use for launching new instances 506. The placement service 516 can implement any of the capability placement technologies described herein. For example, the placement service 516 can receive detailed characteristics from the server computers 502A-502D and/or from other sources (e.g., from an inventory service), determine capability tags, and store the capability tags for later use. The placement service 516 can receive requests to launch instances, determine capability tags describing computing resources to support the instance, identify server computers and/or slots (e.g., one of the server computers 502A-502D) that satisfy the determined capability tags, and select one for launching the instance. The placement service 516 can operate in conjunction with the deployment component 514 and/or with other components (e.g., with a capacity management service).

Customer account information 515 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 530 can be utilized to interconnect the server computers 502A-502D and the server computer 504. The network 530 can be a local area network (LAN) and can be connected to a Wide Area Network (WAN) 540 so that end users can access the compute service provider 500. It should be appreciated that the network topology illustrated in FIG. 5 has been simplified and that many more networks and networking devices can be utilized to interconnect the various computing systems disclosed herein.

Figure 6:
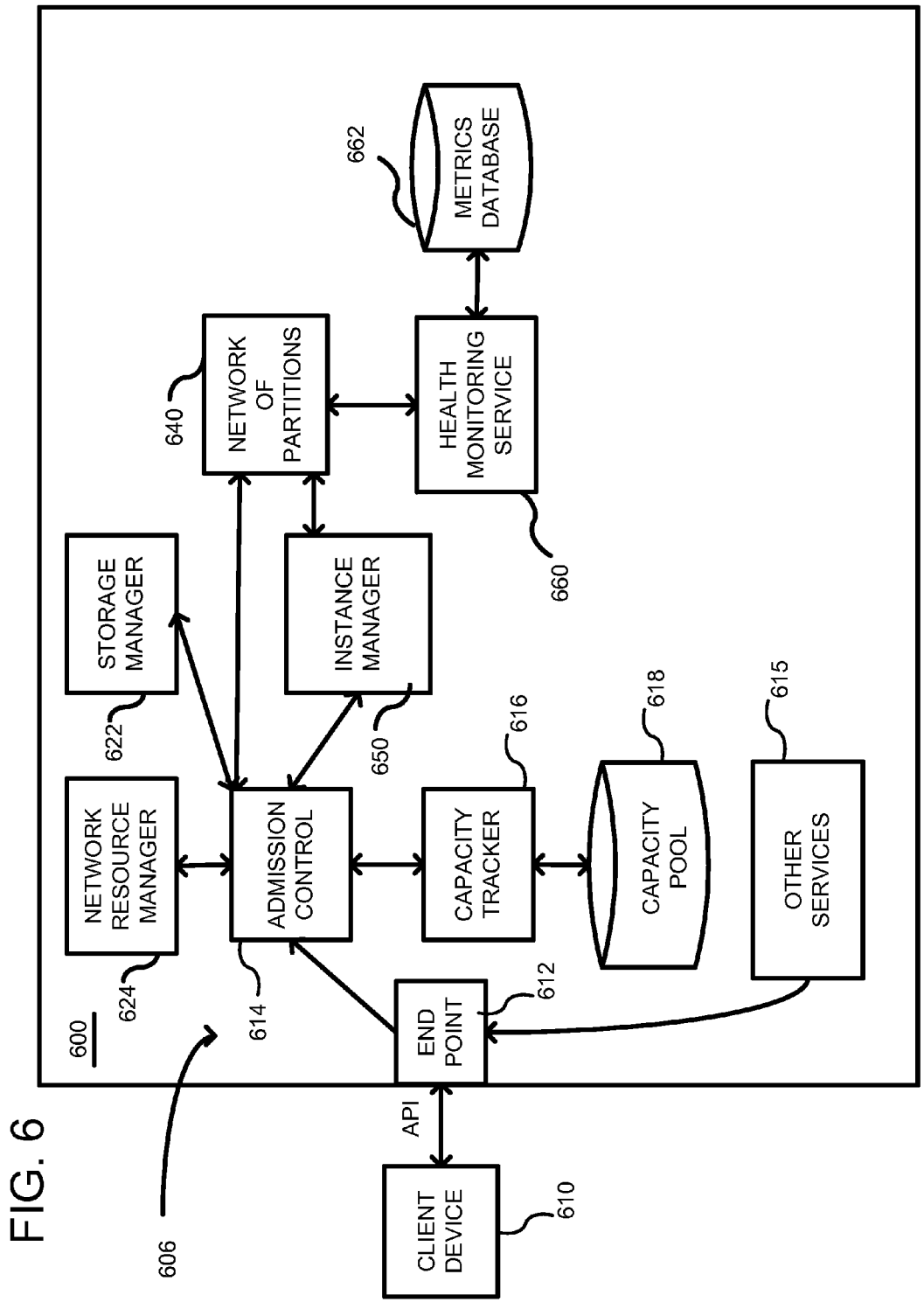
FIG. 6 shows further details of an example system including a plurality of management components associated with a control plane.

FIG. 6 illustrates in further detail management components 606 that can be used in the multi-tenant environment of the compute service provider 500. In order to access and utilize instances (such as instances 506 of FIG. 5), a client device can be used. The client device 610 can be any of a variety of computing devices, mobile or otherwise including a cell phone, smartphone, handheld computer, Personal Digital Assistant (PDA), desktop computer, etc. The client device 610 can communicate with the compute service provider 500 through an end point 612, which can be a DNS address designed to receive and process API requests. In particular, the end point 612 can be a web server configured to expose an API. Using the API requests, a client 610 can make requests to implement any of the functionality described herein. Other services 615, which can be internal to the compute service provider 500, can likewise make API requests to the end point 612.

Other general management services that may or may not be included in the compute service provider 500 include an admission control 614, e.g., one or more computers operating together as an admission control web service. The admission control 614 can authenticate, validate and unpack the API requests for service or storage of data within the compute service provider 500. The capacity tracker 616 is responsible for determining how the servers need to be configured in order to meet the need for the different instance types by managing and configuring physical inventory in terms of forecasting, provisioning and real-time configuration and allocation of capacity. The capacity tracker 616 maintains a pool of available inventory in a capacity pool database 618. The capacity tracker 616 can also monitor capacity levels so as to know whether resources are readily available or limited. An instance manager 650 controls launching and termination of instances in the network. When an instruction is received (such as through an API request) to launch an instance, the instance manager pulls resources from the capacity pool 618 and launches the instance on a decided upon host server computer. Similar to the instance manager are the storage manager 622 and the network resource manager 624. The storage manager 622 relates to initiation and termination of storage volumes, while the network resource manager 624 relates to initiation and termination of routers, switches, subnets, etc. A network of partitions 640 is described further in relation to FIG. 6 and includes a physical layer upon which the instances are launched.

A health monitoring service 660 can provide monitoring for resources and the applications customers run on the compute service provider 500. System administrators can use the monitoring service 660 to collect and track metrics, and gain insight to how applications are running. For example, the monitoring service 660 can allow system-wide visibility into application performance and operational health. Metrics generated by the health monitoring service 660 can be stored in the metrics database 662.

Figure 7:
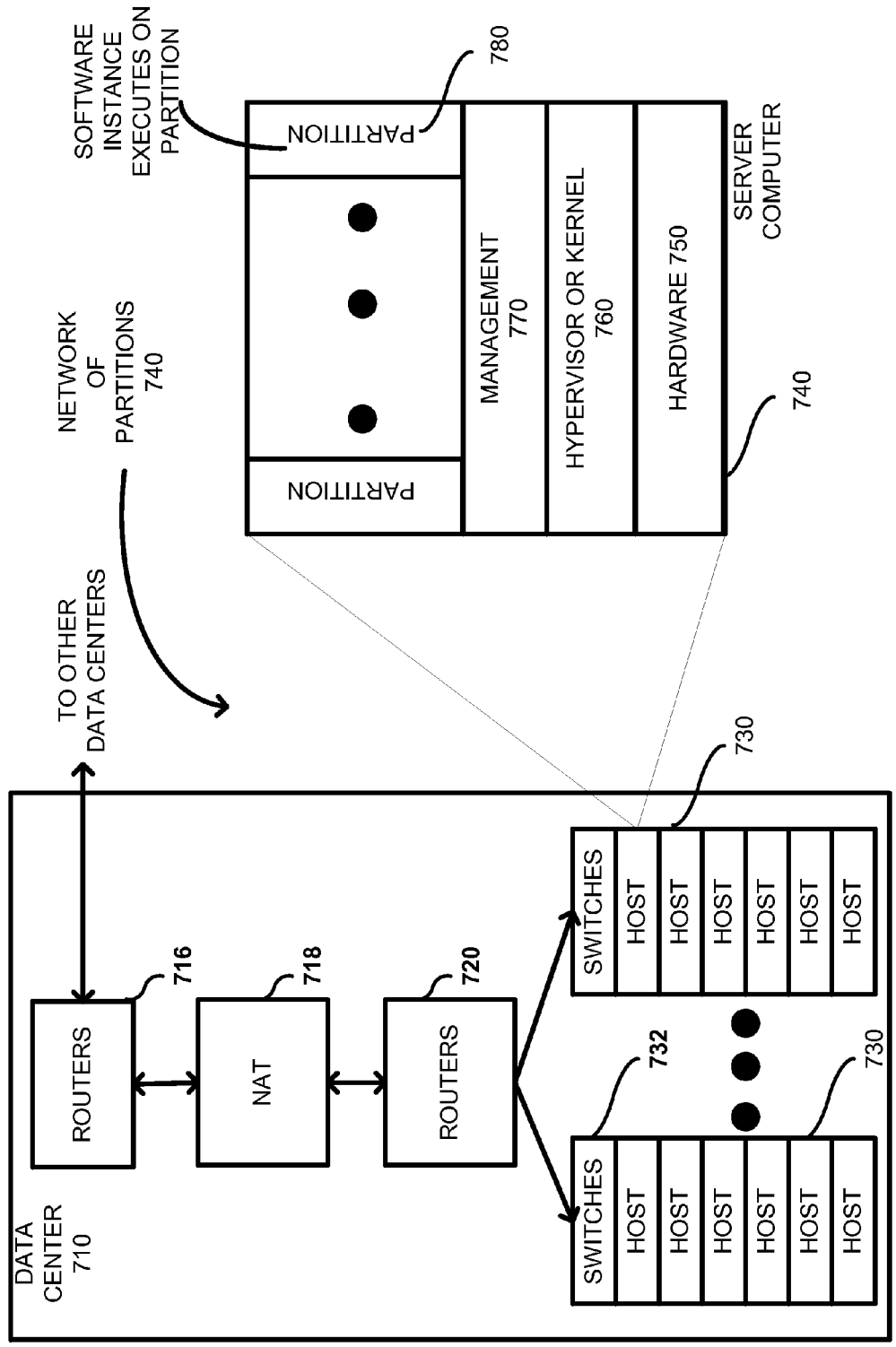
FIG. 7 shows an example of a plurality of host computers, routers and switches, which are hardware assets used for running virtual machine instances.

FIG. 7 illustrates the network of partitions 640 and the physical hardware associated therewith. The network of partitions 640 can include a plurality of data centers, such as data center 710, coupled together by routers 716. The routers 716 read address information in a received packet and determine the packet's destination. If the router decides that a different data center contains a host server computer, then the packet is forwarded to that data center. If the packet is addressed to a host in the data center 710, then it is passed to a network address translator (NAT) 718 that converts the packet's public IP address to a private IP address. The NAT also translates private addresses to public addresses that are bound outside of the datacenter 710. Additional routers 720 can be coupled to the NAT to route packets to one or more racks of host server computers 730. Each rack 730 can include a switch 732 coupled to multiple host server computers. A particular host server computer is shown in an expanded view at 740.

Each host 740 has underlying hardware 750 including one or more CPUs, memory, storage devices, etc. Running a layer above the hardware 750 is a hypervisor or kernel layer 760. The hypervisor or kernel layer can be classified as a type 1 or type 2 hypervisor. A type 1 hypervisor runs directly on the host hardware 750 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 770 can be part of the hypervisor or separated therefrom and generally includes device drivers needed for accessing the hardware 750. The partitions 780 are logical units of isolation by the hypervisor. Each partition 780 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

Any applications executing on the instances can be monitored using the management layer 770, which can then pass the metrics to the health monitoring service 660 for storage in the metrics database 662. Additionally, the management layer 770 can pass to the monitoring service 650 the number of instances that are running, when they were launched, the operating system being used, the applications being run, etc. All such metrics can be used for consumption by the health monitoring service 660 and stored in database 662.

Figure 8:
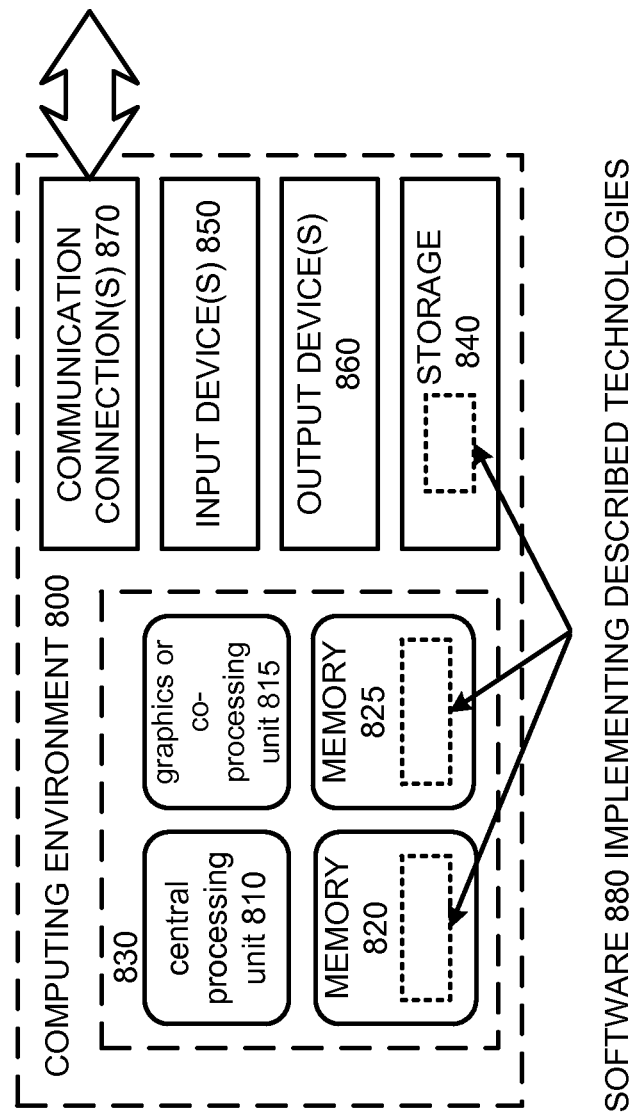
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method, implemented at least in part by one or more computing devices, supporting capability based placement of virtual machine instances, the method comprising:

for each of a plurality of virtual machine slots located on a server computer:
receiving detailed characteristics for the virtual machine slot, the detailed characteristics comprising one or more of: detailed software characteristics and detailed hardware characteristics associated with the server computer;
based on the received detailed characteristics, determining one or more capability tags for the virtual machine slot, wherein the one or more capability tags describe higher-level capabilities of the virtual machine slot than the detailed characteristics, and wherein at least one of the one or more capability tags is an aggregate capability tag that is determined from a plurality of detailed characteristics; and
storing the determined one or more capability tags in association with the virtual machine slot, wherein the one or more capability tags are used when determining instance placement;
wherein the one or more capability tags are determined and stored in association with the virtual machine slot independent of capability tags determined and stored in association with other virtual machine slots of the server computer.

2. The method of claim 1 wherein the detailed hardware characteristics comprise one or more of:
   number of hard disk drives;
   network connection type;
   memory size;
   central processing unit (CPU) manufacturer;
   CPU family;
   CPU architecture; and
   available CPU instruction sets.

3. The method of claim 1 wherein the detailed software characteristics comprise one or more of:
   virtualization software version;
   Basic Input/Output System (BIOS) version; and
   software module information.

4. The method of claim 1 wherein the one or more capability tags comprise one or more of the following:
   a capability tag indicating network capacity;
   a capability tag indicating disk storage throughput;
   a capability tag indicating encryption support; and
   a capability tag indicating operating system support.

5. The method of claim 1 wherein the detailed characteristics comprise detailed location characteristics.

6. The method of claim 5 wherein the detailed location characteristics comprise one or more of:
   a geographical region;
   a country;
   a location within a data center; and
   proximity to a file storage service.

7. The method of claim 1 further comprising:
   determining a first capability tag for a first virtual machine slot, of the plurality of virtual machine slots, located on the server computer; and
   determining a second capability tag, different from the first capability tag, for a second virtual machine slot, of the plurality of virtual machine slots, located on the server computer.

8. The method of claim 1 wherein a plurality of capability tags are determined for a virtual machine slot comprising:
   at least one required capability tag; and
   at least one optional capability tag.

9. A system, comprising:
   one or more computing devices comprising processing units and memory;
   the one or more computing devices configured to:
      receive a request to launch a virtual machine instance;
      receive, from a customer making the request to launch the virtual machine instance, an indication of one or more features associated with the request;
      determine one or more capability tags based at least in part upon the received request, wherein the one or more capability tags are determined, at least in part, to support the one or more features;
      identify one or more virtual machine slots for launching the virtual machine instance that satisfy the determined one or more capability tags by matching the determined one or more capability tags against capability tags associated with a set of potential virtual machine slots, wherein the capability tags associated with the set of potential virtual machine slots describe higher-level capabilities of the virtual machine slots determined from one or more of detailed hardware characteristics and detailed software characteristics; and
      cause the virtual machine instance to be launched on at least one of the one or more identified virtual machine slots.

10. The system of claim 9 wherein the one or more features indicate at least one of the following:
    a database feature;
    a web server feature;
    a video editing feature; and
    a general purpose feature.

11. The system of claim 9 wherein the received request to launch the virtual machine instance comprises a selection of a virtual machine image, and wherein the one or more capability tags are automatically determined at a time of the request based, at least in part, on the selected virtual machine image.

12. The system of claim 9 wherein the received request to launch the virtual machine instance comprises a selection of a virtual machine image, the one or more computing devices further configured to:
    identify one or more pre-associated capability tags that are associated with the virtual machine image, wherein at least one of the one or more capability tags are determined from the one or more pre-associated capability tags.

13. The system of claim 9 wherein the received request to launch the virtual machine instance comprises a selection of a virtual machine image from a catalog of virtual machine images provided by a marketplace, the one or more computing devices further configured to:
    identify one or more pre-associated capability tags that are associated with the virtual machine image, the one or more pre-associated capability tags having been associated with the virtual machine image by a developer of the virtual machine image;
    wherein at least one of the one or more capability tags are determined from the one or more pre-associated capability tags.

14. The system of claim 9 wherein a plurality of capability tags are determined, and wherein the plurality of capability tags comprise:
    at least one required capability tag; and
    at least one optional capability tag.

15. A computer-readable storage medium storing computer-executable instructions for causing one or more computing devices to perform a method supporting capability based placement of virtual machine instances, the method comprising:
    receiving a request to launch a virtual machine instance;
    receiving, from a customer making the request to launch the virtual machine instance, an indication of one or more features associated with the request;
    determining one or more capability tags based at least in part upon the received request, wherein the one or more capability tags are determined, at least in part, to support the one or more features;
    identifying one or more virtual machine slots for launching the virtual machine instance that satisfy the determined one or more capability tags by matching the determined one or more capability tags against capability tags associated with a set of potential virtual machine slots, wherein the capability tags associated with the set of potential virtual machine slots describe higher-level capabilities of the virtual machine slots determined from one or more of detailed hardware characteristics and detailed software characteristics; and launching the virtual machine instance on at least one of the one or more identified virtual machine slots.

16. The computer-readable storage medium of claim 15 wherein the one or more features indicate at least one of the following:
   a database feature;
   a web server feature;
   a video editing feature; and
   a general purpose feature.

17. The computer-readable storage medium of claim 15 wherein the received request to launch the virtual machine instance comprises a selection of a virtual machine image, and wherein the one or more capability tags are automatically determined at a time of the request based, at least in part, on the selected virtual machine image.

18. The computer-readable storage medium of claim 15 wherein the received request to launch the virtual machine instance comprises a selection of a virtual machine image, the method further comprising:
   identifying one or more pre-associated capability tags that are associated with the virtual machine image, wherein at least one of the one or more capability tags are determined from the one or more pre-associated capability tags.

19. The computer-readable storage medium of claim 15 wherein a plurality of capability tags are determined, and wherein the plurality of capability tags comprise:
   at least one required capability tag; and
   at least one optional capability tag.

* * * * *